(12) United States Patent
Miles et al.

(10) Patent No.: US 9,983,326 B2
(45) Date of Patent: May 29, 2018

(54) ELECTROMAGNETIC RECEIVER TRACKING AND REAL-TIME CALIBRATION SYSTEM AND METHOD

(71) Applicant: CGG SERVICES SA, Massy (FR)

(72) Inventors: Philip Miles, Rockwood (CA); Jason Berringer, Rockwood (CA)

(73) Assignee: CGG SERVICES SAS, Massy (FR)

( * ) Notice: Subject to any disclaimer, the term of this patent is extended or adjusted under 35 U.S.C. 154(b) by 257 days.

(21) Appl. No.: 14/678,228

(22) Filed: Apr. 3, 2015

(65) Prior Publication Data

US 2015/0285612 A1    Oct. 8, 2015

Related U.S. Application Data

(60) Provisional application No. 61/975,930, filed on Apr. 7, 2014.

(51) Int. Cl.
| | |
|---|---|
| *G01V 3/00* | (2006.01) |
| *G01V 3/165* | (2006.01) |
| *G01V 3/12* | (2006.01) |
| *G01V 3/08* | (2006.01) |
| *G01V 3/26* | (2006.01) |
| *G01V 3/30* | (2006.01) |

(52) U.S. Cl.
CPC .............. *G01V 3/165* (2013.01); *G01V 3/083* (2013.01); *G01V 3/088* (2013.01); *G01V 3/12* (2013.01); *G01V 3/265* (2013.01); *G01V 3/30* (2013.01)

(58) Field of Classification Search
CPC .......... G01V 3/083; G01V 3/088; G01V 3/12; G01V 3/265; G01V 3/30
USPC ....... 324/323, 327, 329, 330, 332, 334, 337, 324/376
See application file for complete search history.

(56) References Cited

U.S. PATENT DOCUMENTS

| | | | |
|---|---|---|---|
| 3,983,474 A | 9/1976 | Kuipers | |
| 4,829,250 A | 5/1989 | Rotier | |
| 7,715,898 B2 * | 5/2010 | Anderson | ................ A61B 5/06 324/207.14 |
| 2005/0001622 A1* | 1/2005 | Morrison | ............... G01V 3/165 324/330 |
| 2008/0143130 A1* | 6/2008 | Kuzmin | ................... G01V 3/17 294/77 |

(Continued)

FOREIGN PATENT DOCUMENTS

| | | | | |
|---|---|---|---|---|
| WO | 2011/063510 A1 | 6/2011 | | |
| WO | WO2013067624 | * | 11/2011 | ............. G01V 3/165 |

(Continued)

OTHER PUBLICATIONS

F.H. Raab, "Quasi-Static Magnetic-Field Technique for Determining Position and Orientation", IEEE Transactions on Geoscience and Remote Sensing, Oct. 1981, vol. GE-19, No. 4.

*Primary Examiner* — Jermele M Hollington
*Assistant Examiner* — Raul Rios Russo
(74) *Attorney, Agent, or Firm* — Patent Portfolio Builders PLLC

(57) ABSTRACT

An electromagnetic (EM) receiver system for measuring EM signals. The EM receiver system includes a survey EM transmitter for generating survey EM signals within a first frequency range; a tracking EM transmitter for generating tracking signals within a second frequency range; and a receiver section including a receiver that measures both the survey EM signals and the tracking signals.

20 Claims, 18 Drawing Sheets

(56) References Cited

U.S. PATENT DOCUMENTS

| | | | | |
|---|---|---|---|---|
| 2009/0212778 A1* | 8/2009 | Kuzmin | ............... | G01V 3/16 324/330 |
| 2010/0061187 A1* | 3/2010 | Sodal | ............... | G01S 5/22 367/131 |
| 2010/0244843 A1* | 9/2010 | Kuzmin | ............... | G01V 3/165 324/345 |
| 2011/0181290 A1 | 7/2011 | Kuzmin et al. | | |
| 2013/0113646 A1* | 5/2013 | Allouche | ............... | G01S 13/0209 342/21 |
| 2014/0012505 A1* | 1/2014 | Smith | ............... | G01V 3/12 702/2 |
| 2014/0084930 A1* | 3/2014 | Dodds | ............... | G01V 3/17 324/331 |
| 2015/0234078 A1* | 8/2015 | Miles | ............... | G01V 3/165 324/331 |
| 2015/0268369 A1* | 9/2015 | Dodds | ............... | G01V 3/10 324/334 |

FOREIGN PATENT DOCUMENTS

| | | | | |
|---|---|---|---|---|
| WO | 2014/056069 A1 | | 4/2014 | |
| WO | WO2014047730 | * | 4/2014 | ............. G01V 3/165 |

* cited by examiner

ELECTROMAGNETIC RECEIVER TRACKING AND REAL-TIME CALIBRATION SYSTEM AND METHOD

BACKGROUND

Technical Field

Embodiments of the subject matter disclosed herein generally relate to methods and systems and, more particularly, to mechanisms and techniques for tracking an electromagnetic (EM) receiver's position/orientation and/or calibrating the same.

Discussion of the Background

EM surveying is a method of geophysical exploration to determine the properties of a portion of the earth's subsurface, information that is especially helpful in the oil and gas industry. EM surveys may be based on a controlled source that sends EM energy waves into the earth. By measuring the associated secondary fields with an EM receiver, it is possible to estimate the depth and/or composition of the subsurface features. These features may be associated with subterranean hydrocarbon deposits.

An airborne EM survey system 100 generally includes, as illustrated in FIG. 1, a transmitter 102 for generating a primary electromagnetic field 104 that is directed toward the earth. When the primary EM field 104 enters the ground 108, it induces eddy currents 106 inside the earth. These eddy currents 106 generate a secondary electromagnetic field or ground response 110. An EM receiver 112 then measures the response 110 of the ground. Transmitter 102 and receiver 112 may be connected to an aircraft 114 so that a large area of the ground is swept. Receiver 112 may be located concentric with transmitter 102. The currents induced in the ground are a function of the earth's conductivity and of course, the transmitter characteristics. By processing and interpreting the received signals, it is possible to study and estimate the distribution of conductivity in the subsurface. The distribution of conductivity is associated with the various layers 116 and 118 making up the subsurface, which is implicitly indicative of the location of oil and gas reservoirs, and/or other resources of interest for the mining industry.

EM systems can be either frequency-domain or time-domain. Both types of systems are based on principles encapsulated in Faraday's Law of electromagnetic induction, which states that a time-varying primary magnetic field will produce an electric field. For airborne systems, the primary field is created by passing a current through a transmitter loop (or series of transmitter loops). The temporal changes to the created or radiated magnetic field induce electrical eddy currents in the ground. These currents have an associated secondary magnetic field that can be sensed, together with the primary field, by a series of receiver coils.

Each receiver coil may consist of a series of wire loops, in which a voltage is induced proportional to the strength of the secondary electromagnetic field from the eddy currents in the ground and their rate of change with time. Typical receiver coils have axes in the three Cartesian directions that are orthogonal to one another. Coils with their axes in the same direction as the transmitter coil axis are most sensitive to horizontal layers and half-spaces if the transmitter coil is horizontal. Coils with their axes orthogonal to the horizontal ground are most sensitive to discrete or vertical conductors.

In frequency-domain systems, the time-varying transmitter signal is a sinusoidal waveform of constant frequency, inducing electrical currents in the ground of the same frequency. Most systems use several constant frequencies that are treated independently. Although the secondary field has the same frequency as the primary field, it will have a different amplitude and phase. It is customary to separate the secondary response into two components: in-phase and quadrature. The in-phase component is defined as having the same phase as the transmitter waveform, whereas the quadrature component is shifted in phase by 90° with respect to the in-phase component.

For time-domain systems, a time-varying field is created by a current that may be pulsed. The change in the transmitted current induces an electrical current in the ground that persists after the primary field is turned off. Typical time domain receiver coils measure the rate of change of decay of this secondary field. The time-domain transmitter current waveform repeats itself periodically and can be transformed to the frequency domain where each harmonic has a specific amplitude and phase.

During survey flying, an airborne EM system generally attempts to maintain a certain transmitter altitude and a receiver altitude above the topography. As the terrain changes, the aircraft needs to adjust to maintain constant altitude with respect to the ground, thereby producing inconsistency in the speed and attitude of the aircraft.

Because the receiver is towed by the aircraft, its position, relative to the aircraft, is also altered. Variations in the transmitter and receiver geometry manifest themselves as position changes in each of the x-, y-, and z directions. Changes in the attitude of the transmitter have a similar effect to moving the position of the receiver. For example, if the aircraft was to pitch its nose down, it would have a similar effect on the primary field as moving the receiver some distance closer to the aircraft along the x-direction, thereby changing the amount of primary field measured at the receiver. Thus, position variations of the EM receiver are a source of EM radiation, which is essentially noise. Only a portion of the total noise measured by the EM receiver is caused by changes in orientation and/or position of the receiver's coils.

Thus, the movement of the receiver can create undesirable noise in the EM measurement data. As a result, some attempts have been made in current EM systems to compensate for the noise/error using receiver position or orientation data.

For example, International Patent Application WO2011/063510 describes an airborne geophysical surveying system with a receiver orientation sensing system. However, this sensing system requires complex integration of many components, including three angular accelerometers, a three-axis fluxgate magnetometer and two axis-tilt sensors. In addition, as the noise is calculated based on independent receiver orientation data, which can be out-of-sync with the EM response, this sensing system may not provide accurate EM measurement compensation and is potentially prone to introducing additional errors.

In the context of subsurface drill guidance and mine rescue, Frederick H. Raab describes, in "Quasi-Static Magnetic-Field Technique for Determining Position and Orientation", IEEE Transactions on Geoscience and Remote Sensing, Vol. GE-19, No. 4, October 1981, pp. 235-243 (Raab herein), a technique to measure position and orientation based on multi-axis excitation and sensing of quasi-static magnetic fields. However, this technique generally is not readily applied to time-domain EM systems because the tracking signals are additive and can mask the very small signals of interest in the earth response.

Other existing prior art systems for determining object position and orientation, such as those described in U.S. Pat.

No. 3,983,474 to Kuipers, and U.S. Pat. No. 4,829,250 to Rotier, generally suffer from complex integration problems for use in airborne EM surveying systems and are not readily applicable in airborne time domain EM systems.

Therefore, there remains a need for an improved system for tracking EM receivers used in EM surveying systems.

SUMMARY

Some of the embodiments discussed herein overcome the drawbacks of existing EM systems by providing an airborne EM system that is configurable to generate EM response data with the receiver tracking signals embedded therein, thus allowing accurate extraction of receiver coordinates from the EM response data without negatively impacting the signal-to-noise ratio of the EM system.

According to one embodiment, there is an electromagnetic (EM) receiver system for measuring EM signals. The EM receiver system includes a survey EM transmitter for generating survey EM signals within a first frequency range; a tracking EM transmitter for generating tracking signals within a second frequency range; and a receiver section including a receiver that measures both the survey EM signals and the tracking signals.

According to another embodiment, there is an electromagnetic (EM) system for measuring EM signals. The EM system includes an aircraft; a transmitter section; a receiver section; and a tow assembly connecting the transmitter section and the receiver section to the aircraft. The transmitter section includes a survey EM transmitter for generating survey EM signals within a first frequency range, and a tracking EM transmitter for generating tracking signals within a second frequency range. The receiver section includes a receiver that measures both the survey EM signals and the tracking signals.

According to still another embodiment, there is a method for determining the position and/or orientation of an electromagnetic receiver. The method includes a step of crossing a given exploration area with a transmitter section, wherein the transmitter section includes a survey EM transmitter (314) for generating survey EM signals within a first frequency range and a tracking EM transmitter for generating tracking signals within a second frequency range, and a step of recording with a receiver section including a receiver both the survey EM signals and the tracking signals.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
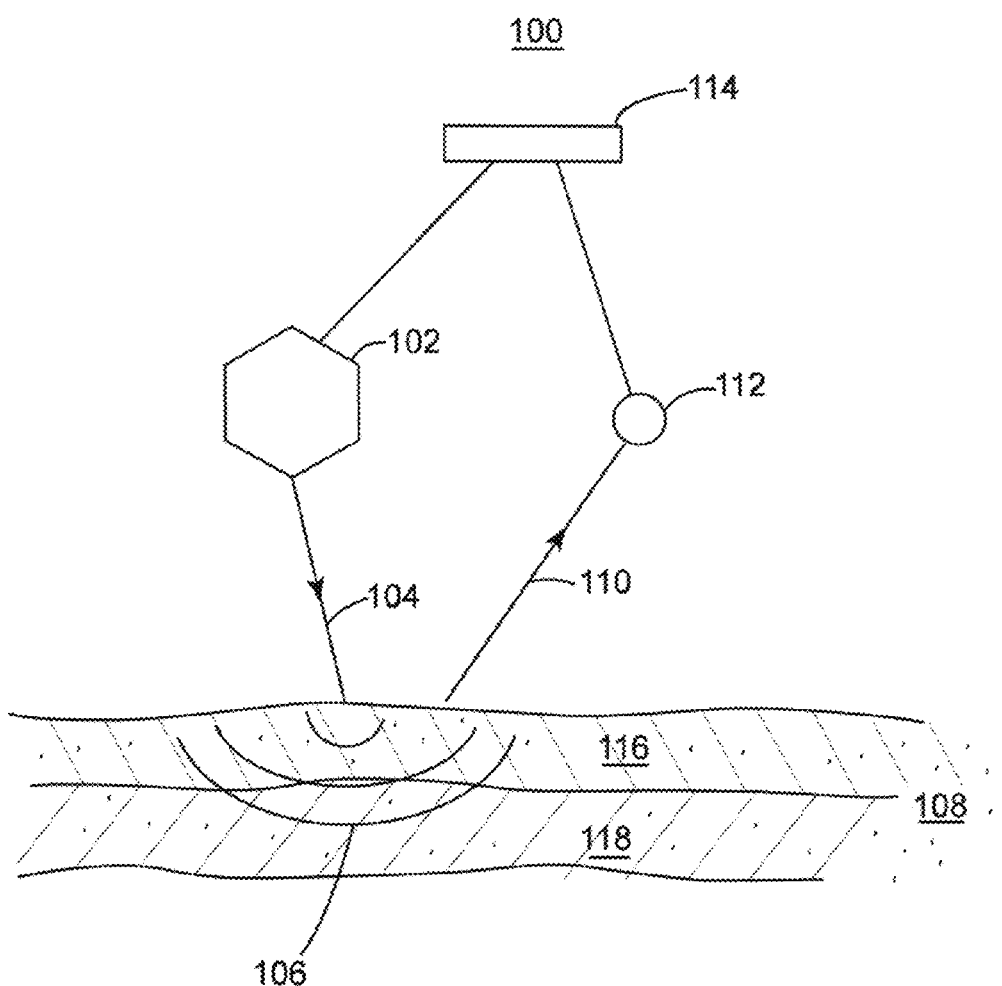
FIG. 1 is a schematic diagram of an EM acquisition system.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of an EM survey system with three EM receiver coils and a tracking EM transmitter having three coils. However, the embodiments to be discussed next are not limited to this configuration; they may be applied to configurations having less than three receiver coils and/or transmitter coils.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, an overall reception sensitivity is improved and operation noises are reduced in an EM system by providing an airborne EM system having a transmitter for generating a primary electromagnetic field that induces a secondary electromagnetic field in the ground, a receiver for measuring the ground EM response, and a tracking system that enables the compensation of the measured EM response for the receiver motion. The tracking system described herein includes a tracking transmitter for generating a tracking electromagnetic field that is measured by the receiver for deriving coordinates thereof, thereby enabling receiver movement compensation for the measured ground EM response.

In accordance with one aspect of the present invention, there is provided an electromagnetic tracking system including a survey transmitter for generating a survey electromagnetic field; a tracking transmitter for generating a tracking electromagnetic field; a receiver for measuring the survey and tracking electromagnetic fields; and means for deriving coordinates of the receiver based on the tracking electromagnetic field measurements.

According to a further aspect, there is provided an electromagnetic tracking and calibrating system that includes: a survey transmitter for generating a survey electromagnetic field; one or more tracking transmitters for generating a tracking electromagnetic field; a receiver for measuring the survey and tracking electromagnetic fields; means for deriving coordinates of the receiver based on the tracking electromagnetic field measurements; and means for calibrating the receiver movement compensation from the survey electromagnetic field measurements.

Advantageously, various embodiments of the present invention provide an EM receiver that allows for synchronized measurements of the ground EM response and the EM receiver position/orientation, thus providing simplified and accurate compensation for receiver movement.

Figure 2:
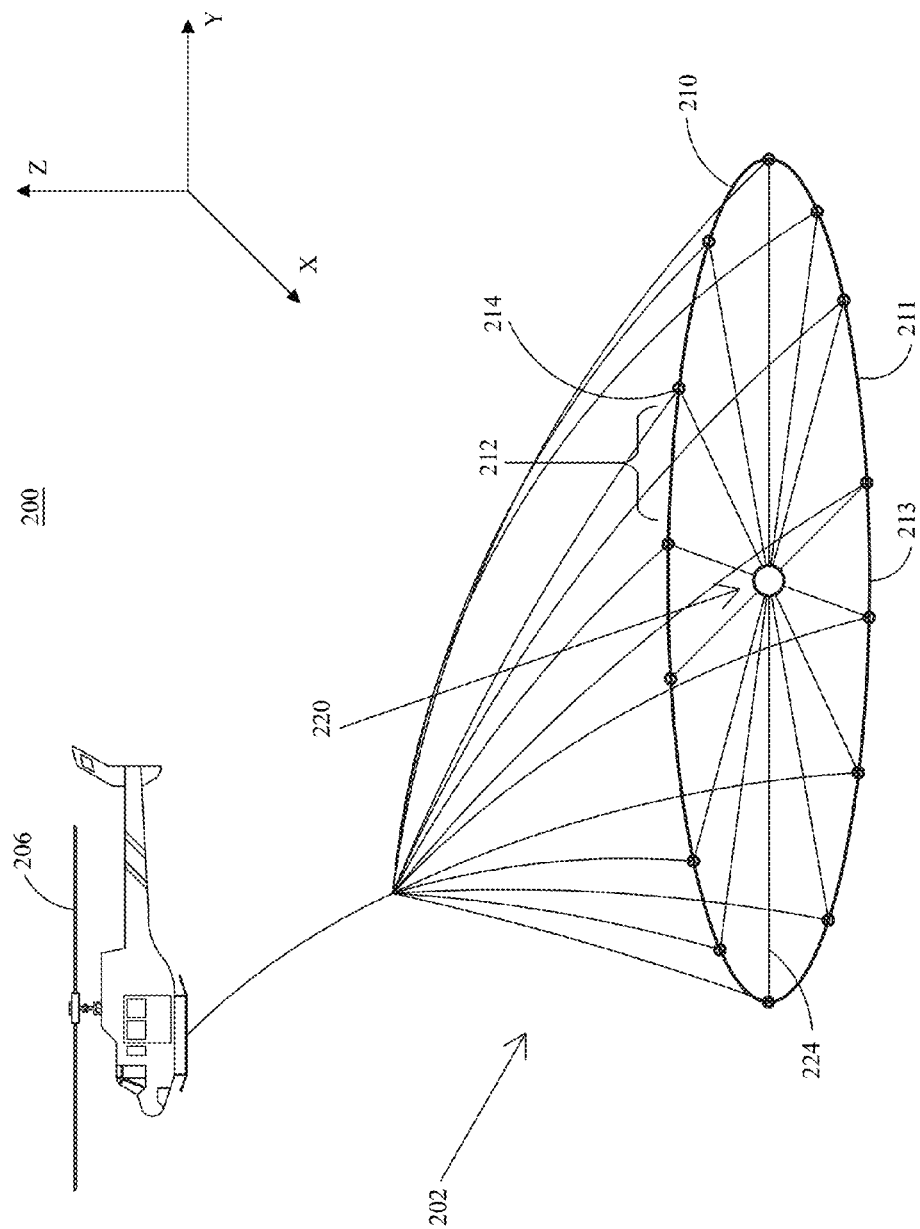
FIG. 2 is a perspective view of an embodiment of the airborne EM system in an airborne position flying at surveying speeds.

Referring to FIG. 2, an aircraft towed EM survey system 200 includes a tow assembly 202 connected to a transmitter section 210 and a receiver section 220. An aircraft 206 carrying the tow assembly 202 can be manned or unmanned power driven fixed-wing airplane, helicopter, airship or any other flying machine. In another embodiment, aircraft 206 may be replaced with a land vehicle or a person that carries a receiver across an area of interest.

The transmitter section 210 may include a transmitter loop frame 211 which supports a transmitter loop coil 213 for generating a primary electromagnetic field that induces a secondary electromagnetic field in the ground. Preferably, the transmitter frame 211 has tubular sections 212 that are serially connected at a plurality of joints 214. However, a person skilled in the art would appreciate that the systems disclosed herein may work with any type of transmitter or generator as a source of electromagnetic energy.

In some embodiments, the transmitter frame comprises tubular sections 212 that are made of generally rigid or semi-rigid material. For example, materials such as carbon fiber reinforced plastic, carbon fiber reinforced polymer, unplasticized polyvinyl chloride (uPVC), wood/plastic composite, or any other composite or materials that provide strong rigidity, stability and resistance to deformation, can be used to construct tubular sections 212 or portions thereof. Preferably, lightweight materials are used for constructing tubular sections 212 or transmitter section 210 to allow for constructing sizable transmitter frame without significantly increasing the weight thereof.

Advantageously, using rigid material to construct the transmitter section 210 allows its size to be increased while maintaining its overall stability and structural integrity. In some embodiments, the tubular sections 212 are connected in a manner that substantially eliminates the relative rotation between the connected tubular sections 212, thereby allowing the transmitter frame to retain a rigid shape during operation, or preventing distortion of the shape of the transmitter section 210.

The rigid and modular transmitter frame 210 described herein therefore provides stable support for large transmitter loop and will maintain its rigidity and stability as the size of the transmitter loop varies. For example, transmitter loop having diameter in excess of about 30 meters and weight of about 500 kg can be achieved.

The receiver section 220 of the embodiment shown in FIG. 2 is positioned along a central axis that is substantially perpendicular to the plane defined by the transmitter frame, and is coupled to the transmitter section 210 by a plurality of cross support means 224 such as cross ropes or cross bars or rods. However, a person skilled in the art would appreciate that the systems disclosed herein may work with any type of receiver section 220.

For example, the receiver section 220 may be disposed in a co-planar fashion with the transmitter section 210 as illustrated in FIG. 2, or may be concentric or co-axial with the transmitter section 210. For example, receiver section 220 may be positioned above or below the plane as defined by the transmitter section 210, at the center of the transmitter section 210, and/or offset from the center of the transmitter section 210. The receiver section includes a receiver which may be supported in any manner known in the art and may comprise at least one receiver coil. In one embodiment, receiver section includes at least one receiver (e.g., coil) per axis, where the axis is one of the three axes X, Y and Z making up a reference system. In still another embodiment, more than one receiver per axis (e.g., two or more receivers with each receiver tuned for a specific frequency range) may be included in the receiver section 220.

The operation of the airborne EM system 200 may introduce movement or vibrations in the towed equipment 202. For example, downwash created by the aerodynamic action of a wing or helicopter rotor blade in motion may cause various undesirable vibrations, including rotational and torsional vibrations, in the equipment towed below an aircraft or helicopter such as an EM receiver. In addition, erratic movement of the EM system receiver section 220 assembly in the earth's geomagnetic field may result in unwanted position or orientation changes in the receiver coils which produce noise in the EM measurements. Other sources of noise may include acoustic, solid and electromagnetic sources of excitation.

Figure 3:
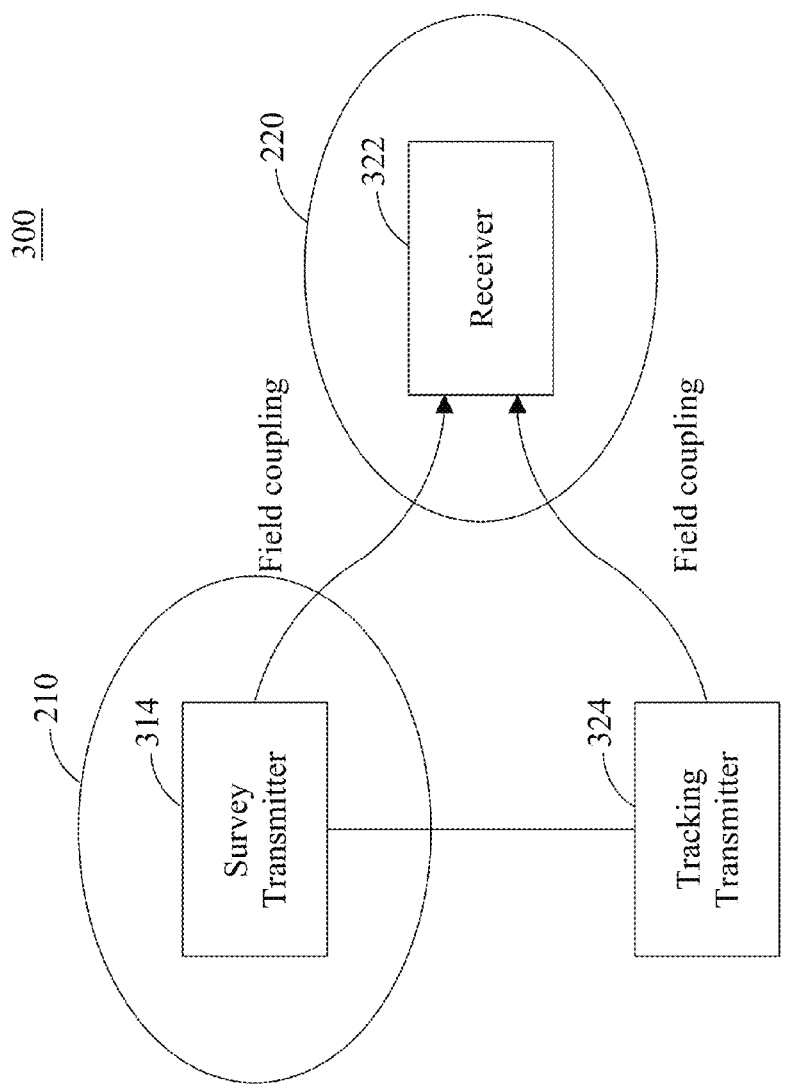
FIG. 3 is a block diagram of a EM system having a survey transmitter and a tracking transmitter.

Thus, according to an embodiment, an airborne EM system 300 includes a simple, flexible system for tracking receiver movement and compensating the receiver EM measurements based on the receiver movement. Referring to the block diagram shown in FIG. 3, and in accordance with an embodiment of the present disclosure, an airborne EM survey system includes a survey transmitter 314, generally located in the transmitter section 210, for generating primary EM field, at least one receiver 322, generally located in the receiver section 220, for measuring the ground EM response, and a tracking transmitter 324 configured to generate tracking signals. The tracking transmitter 324 may be located anywhere in the EM survey system. However, it is more advantageous to locate the tracking transmitter as close as possible to the receiver 322. The tracking signals are intended to be measured by the same receiver 322 that measures the survey EM signals, for deriving coordinates thereof, thereby enabling receiver movement compensation for the measured ground EM response.

Thus, according to this embodiment, the airborne EM system 300 includes two different and separated transmitters, a survey transmitter 314 and a tracking transmitter 324, which are configured to emit their own specific range of frequencies.

In one application, the tracking transmitter 324 comprises at least one transmitter coil configurable to generate EM signals. Preferably, the tracking transmitter 324 includes at least two mutually orthogonal transmitter coils. A larger number of coils may be used for the tracking transmitter 324, for example, three mutually orthogonal transmitter coils each independently configurable to generate EM signals in respective direction.

In one application, the receiver 322 includes one or more receiver coils each configurable to independently measure each of the tracking signals. In another application, receiver 322 includes at least two mutually orthogonal receiver coils. In yet another application, receiver 322 comprises three mutually orthogonal receiver coil assemblies each independently configurable to measure each of the tracking signals.

All these applications discussed herein can be mixed up as would be easily understood by one skilled in the art.

The tracking transmitter 324 may be rigidly attached to a tracking reference frame with respect to the receiver 322. The tracking transmitter 324 can be positioned at any suitable location in the EM system 300 and/or in any desirable orientation, as long as the emitted signals can be measured by the receiver 322 and be properly solved during further processing.

In one embodiment, at least one receiver coil is substantially aligned with at least one axis of the tracking reference frame. In one application, at least one tracking transmitter coil is substantially aligned with at least one axis of the tracking reference frame. For example, in some embodiments, an axis of at least one receiver coil or tracking transmitter coil is substantially parallel or coaxial with at least one axis of the tracking reference frame.

In another embodiment, tracking transmitter 324 is located in close proximity to the receiver 322 when comparing with the distance between the survey transmitter 314 and the receiver 322. For example, the distance between the tracking transmitter 324 and receiver 322 may be in the order of centimeters while the distance between the survey transmitter 314 and receiver 322 may be in the order of meters.

The dimension or size of the tracking transmitter 324 is small relative to the distance between the tracking transmitter 324 and receiver 322. In one embodiment, a distance between the tracking transmitter and the receiver is smaller than a radius of the survey transmitter. In still another embodiment, the distance is much smaller than the radius. In yet another embodiment, the distance is ten times smaller than the radius. In some embodiments, the tracking transmitter 324 can be releasably secured to the receiver housing or supporting structure. In one application, tracking transmitter 324 is secured to a rigid or semi-rigid portion of the receiver support structure.

The tracking transmitter 324 can be configured to generate signals using alternating current (AC), direct current (DC), or combination thereof. In an embodiment, in which a tracking transmitter 324 based on AC signals where three mutually orthogonal transmitter coils are used, a current is supplied to the transmitter coils in a sequence so that three mutually perpendicular electromagnetic fields are generated. The fields induce currents in the receiver 322 that has three mutually perpendicular coils. Based on the resulting nine induced currents, the receiver location and orientation relative to the tracking transmitter 324 can be estimated. A frequency range of the tracking transmitter may overlap a frequency range of the survey transmitter. For example, the tracking transmitter may transmit in the 4-7 kHz range while the survey transmitter may transmit in the 30 Hz to 100 kHz range. Those skilled in the art would appreciate that other frequency ranges are possible.

Figure 4:
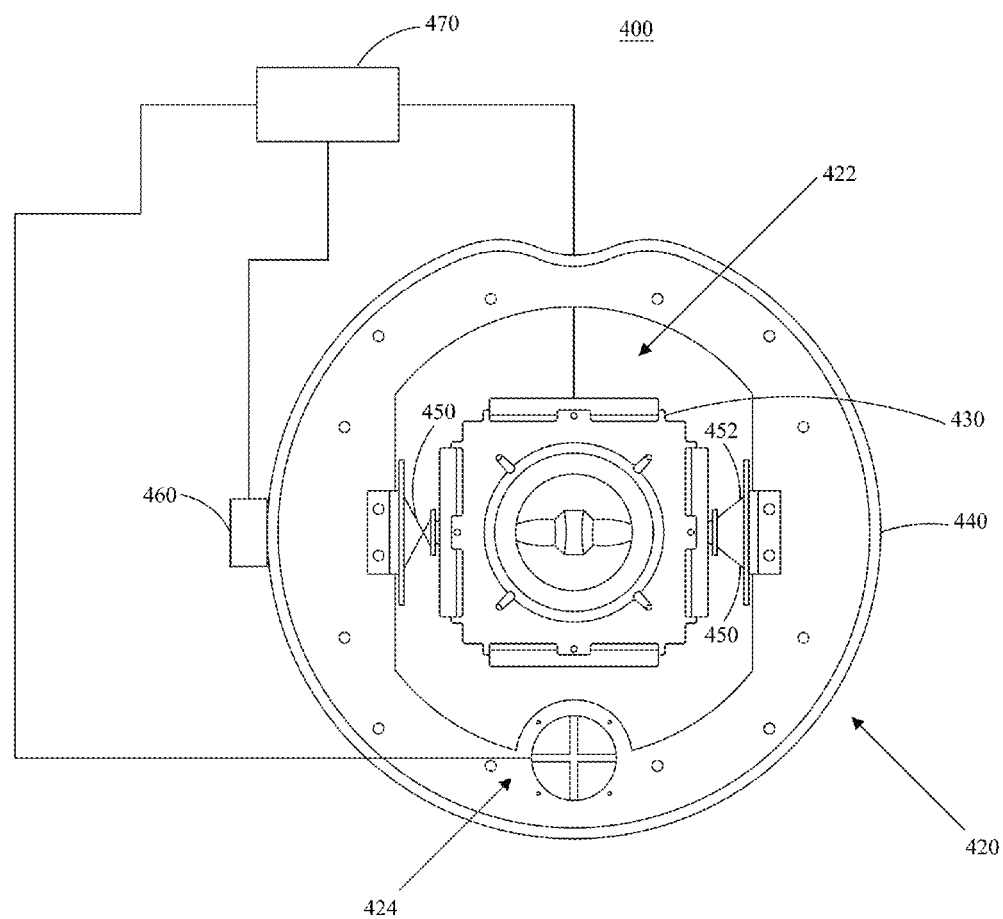
FIGS. 4-6 are schematic diagrams of the receiver section of the EM system.
Figure 5:
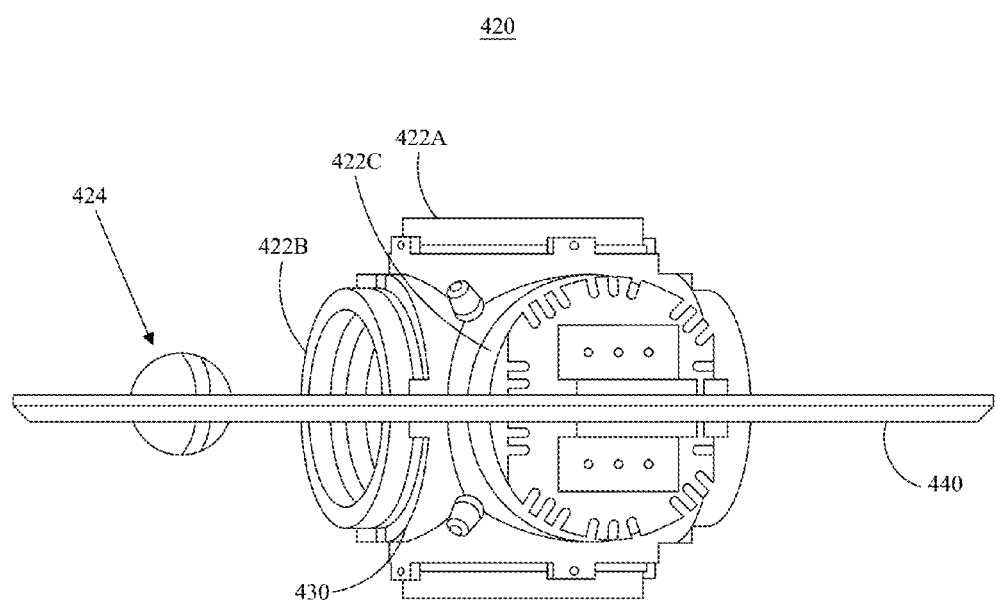
Figure 6:
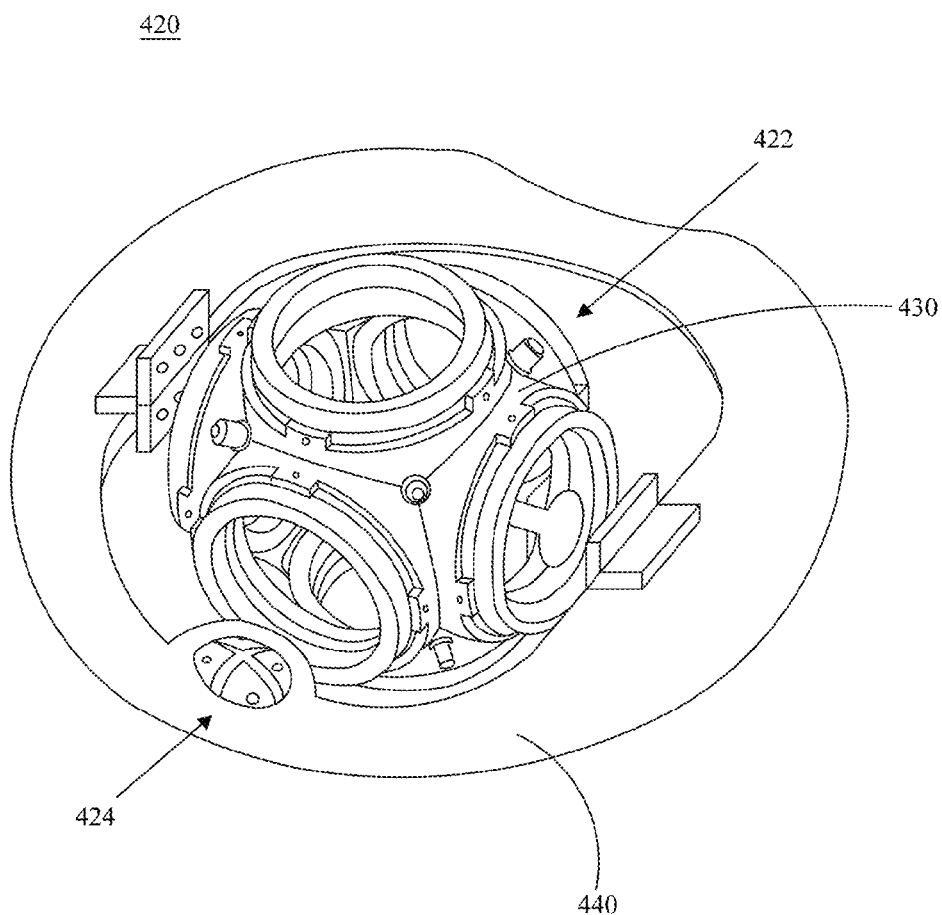

In one embodiment as illustrated in FIG. 4, an EM survey system 400 includes a receiver section 420. Receiver section 420 has a receiver housing 430 that is configured to hold receiver 422. Receiver section 420 may also include a tracking reference frame 440 to which the tracking transmitter 424 is rigidly attached. FIG. 5 shows a side view and FIG. 6 shows a perspective view of receiver section 420 having plural receiver coils 422A-C oriented perpendicular to each other and being attached to receiver housing 430. Tracking reference frame 440 is shown in FIG. 5 encircling receiver housing 430 and receiver 422. Tracking transmitter 424 is rigidly attached to tracking reference frame 440 and includes a small three-axis magnetic-transmitter in close proximity to a suspended three axis EM receiver 422.

Tracking transmitter 424 provides, as will be discussed later, information sufficient to determine the relative position and orientation of the receiver 422 relative to tracking reference frame 440. If the tracking transmitter 424 is programmed to transmit sequentially in each axis during the late time "window" of the survey transmitter, the resultant 9 sensor measurements provide for a 6 degrees of freedom location estimate with minimal impact on the surveying EM signal at twice the EM pulse repetition rate. An example of an algorithm for determining the relative position of a receiver relative to a source (tracking transmitter) is disclosed in Raab, the entire content of which is incorporated herein by reference. Note that this article indicates that a source or receiver having less than three coils may be used for determining the position and/or orientation of the receiver relative to the source.

A connecting mechanism 450 between tracking reference frame 440 and receiver housing 430 is shown in FIG. 4. Connecting mechanism 450 may include plural cords 452 that connect the frame to the housing. The cords may be elastic, e.g., bungee cords, so that the receiver housing can freely translate and rotate in all directions. The number of cords depends at least on the weight of receiver housing.

Receiver section 420 shown in FIG. 4 may also include a GPS system 460 for determining a position and/or orientation of the tracking transmitter relative to ground. In this way, knowing (1) the position and/or orientation of the receiver relative to the tracking transmitter and (2) the position and/or orientation of the tracking transmitter relative to ground, a control mechanism 470, which is shown schematically communicating with the receiver, tracking transmitter and GPS system, can adjust/calculate the actual position and/or orientation of the receiver 422 (i.e., receiver coils 422A-C) relative to ground. Control mechanism 470 is discussed later and it can be located on the aircraft, on the receiver section, on the survey transmitter or distributed among these elements.

In one embodiment, tracking transmitter 424 and/or tracking reference frame 440 are located in the same plane as the survey transmitter section 210. In this way, a potential swinging motion of the tracking transmitter relative to the aircraft is coincident with a swinging motion of the transmitter section, cancelling out possible sources of error for determining the position and orientation of the receivers.

As noted above, the tracking transmitter 324 may use AC signals. In another embodiment, the tracking transmitter 324 is based on DC signals. Thus, a sequence of DC pulses is used to excite the one or more tracking transmitter coils. The induced current is recorded on the associated receiving coil after a predetermined delay allowing the Eddy currents to die out. The resulting nine measured values are then used to compute the location and/or orientation of the receiver 322 relative to the tracking transmitter 324.

In some embodiments, the tracking transmitter 324 is configurable to generate a mixture of AC and DC signals in any suitable pattern. For example, during an interval of receiver tracking, measurements may be taken based on AC signal, DC signal, or a combination thereof.

As a person skilled in the art would appreciate, the tracking signals need not be generated sequentially or in any particular sequence or pattern at all times, and can be generated concurrently in some example embodiments, or be distributed among the transmitter coils in any desirable pattern.

The choice of using AC or DC signal generally depends on the design requirements of an EM system and/or the particulars of the survey project. For example, AC signals may provide greater positional accuracy and act as more effective calibration signals because both phase and amplitude of the tracking signals can be readily determined and used to monitor the EM receiver's drift over time. However, pulsed DC signals will have less impact on the stacked ground EM response.

In both AC and DC tracking systems, Eddy currents may be generated near metallic objects, potentially leading to tracking errors. Accordingly, where it is feasible, the survey systems use non-conductive, non-magnetic components for the construction of the receiver section 220 and receiver support structure to minimize Eddy currents.

Advantageously, one or more embodiments provides an EM receiver 322 that can be used for measuring both the ground EM response and the movement of the EM receiver coils relative to the tracking transmitter 324, simplifying the system for tracking the EM receiver 322. However, in one application, an additional receiver is placed on the receiver housing and used exclusively for tracking purposes.

The EM system described herein is configurable to generate EM response data with the tracking signals embedded with the survey EM data, and allows for easy decoupling of tracking signals from the survey EM data and accurate extraction of receiver coordinates from the survey EM response data.

Figure 7:
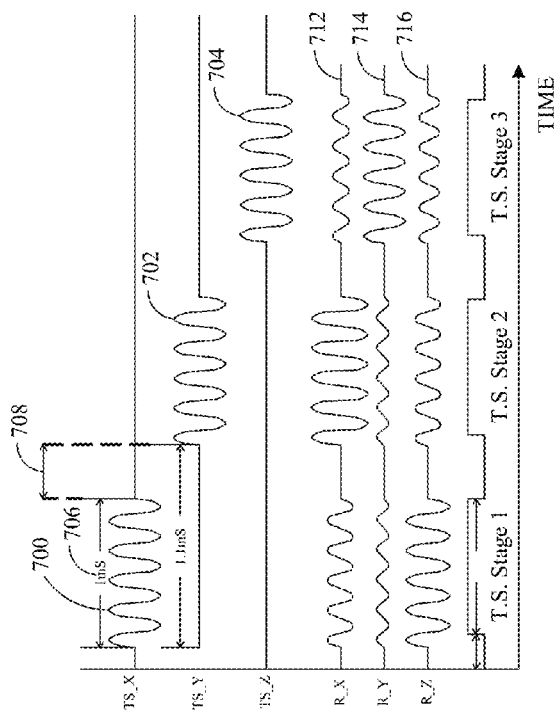
FIG. 7 is a graphs illustrating the tracking signals generated by the tracking transmitter.
Figure 8:
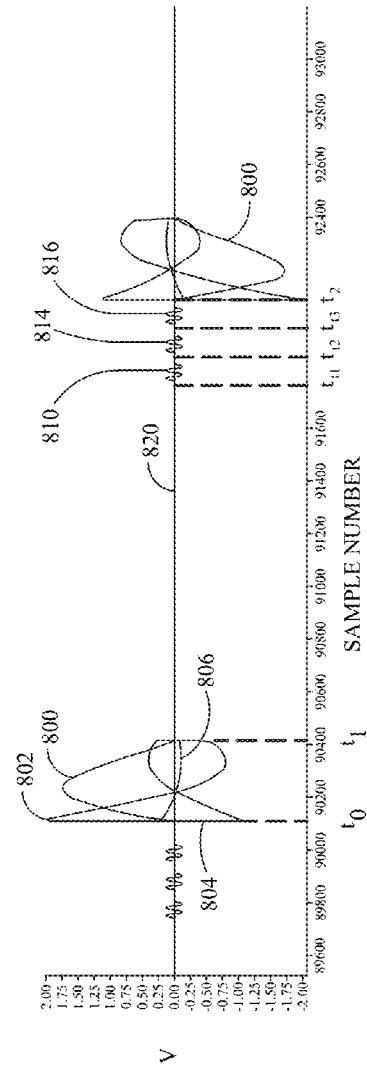
FIG. 8 is a graph illustrating the tracking signals and the survey EM data recorded by the same receiver.

Such an embodiment is now discussed with regard to FIGS. 7 and 8. FIG. 7 shows the tracking signals 700, 702 and 704 (for example, signal 700 corresponds to X coil, signal 702 to Y coil and signal 704 to Z coil, where the X, Y and Z coils can be in any order) generated by the three coils of the tracking transmitter 424. The three tracking signals are generated at different times, in a sequential pattern, as illustrated by Stages 1-3 in the figure. A length 706 of the tracking signal for a given coil may be in the ms order, for example, 1 ms. Other values may be possible. A dead-time between two consecutive tracking signals 700 and 702 may also have a value in the ms order, for example 0.1 ms or even 0 s. The receiver coils 422A-C record these signals, called herein primary tracking signals as curves 712, 714, and 716, respectively. Note that each receiver coil records a corresponding primary tracking. Thus, the survey receiver coils 422A-C record, in addition to the survey EM data, nine tracking components as discussed above. FIG. 7 does not show the survey EM data. The primary tracking signal is understood to be the result of the magnetic field generated at the tracking transmitter 424 and propagating directly to the receiver 422 without entering the ground and generating Eddy currents. This is so because the tracking transmitter is closely placed next to the receiver and the power of tracking signals is small. Contrary to this, the survey EM data recorded by the same receiver 422 is a result of magnetic fields, generated by the survey transmitter, propagating into the earth, exciting Eddy currents, and generating secondary magnetic fields which are then recorded by the receiver 422.

The tracking signals and the survey EM data (or signals) are shown in FIG. 8. FIG. 8 plots the voltage measured at each receiver coil versus a sample number. Various time labels are indicated on the X axis and they correspond to the following events. Time $t_0$ corresponds to the instant when a voltage/current is applied to the survey transmitter to generate the magnetic fields that propagate into the earth. Time $t_1$ corresponds to the instant when the voltage/current applied to the survey transmitter is switched off. The time interval between $t_0$ and $t_1$ is called the ON-time, the time when the survey transmitter is active. Curve 800 represents the ON signal applied to the survey transmitter while curves 802, 804 and 806 represent the primary survey signals recorded by the receiver coils 422A-C, respectively, during this ON-time.

Time $t_2$ corresponds to the instant when the survey transmitter is again activated. The time interval between $t_1$ and $t_2$ is called the OFF-time, the time when the survey transmitter is silent and the receiver 422 records survey EM data. However, according to this embodiment, the tracking transmitter is turned on at times $t_{t1}$, $t_{t2}$ and $t_{t3}$, so that each coil of the tracking transmitter generates its own tracking signal, labeled in the figure with 810, 814 and 816. Thus, during most of the OFF-time interval, survey data 820 is recorded by the receiver 422, while for a limited time interval $t_{t1}$-$t_2$ of the OFF-time interval, both survey EM data 820 and tracking signals 810, 814, and 816 are recorded by the same receiver 422.

The extent of the tracking time interval $t_2$-$t_{t1}$ relative to the total OFF-time interval $t_2$-$t_1$ may vary. In one embodiment, the tracking time interval $t_2$-$t_{t1}$ is 20% or less of the OFF-time interval. In another embodiment, this percentage is 10%. Still in another embodiment, the tracking time interval $t_2$-$t_{t1}$ takes place in the last time channel (to be explained later). In yet another embodiment, the tracking time interval $t_2$-$t_1$ extends over two or more time channels. Although the tracking time interval $t_2$-$t_{t1}$ is better to be placed at the end of the OFF-time, in fact, it can be placed anywhere along the OFF-time as long as the frequency of the tracking signal can be discerned from the frequency of the survey EM data. For that reason, in one embodiment, the tracking time interval $t_2$-$t_{t1}$ can be placed during the ON-time interval.

Figure 9:
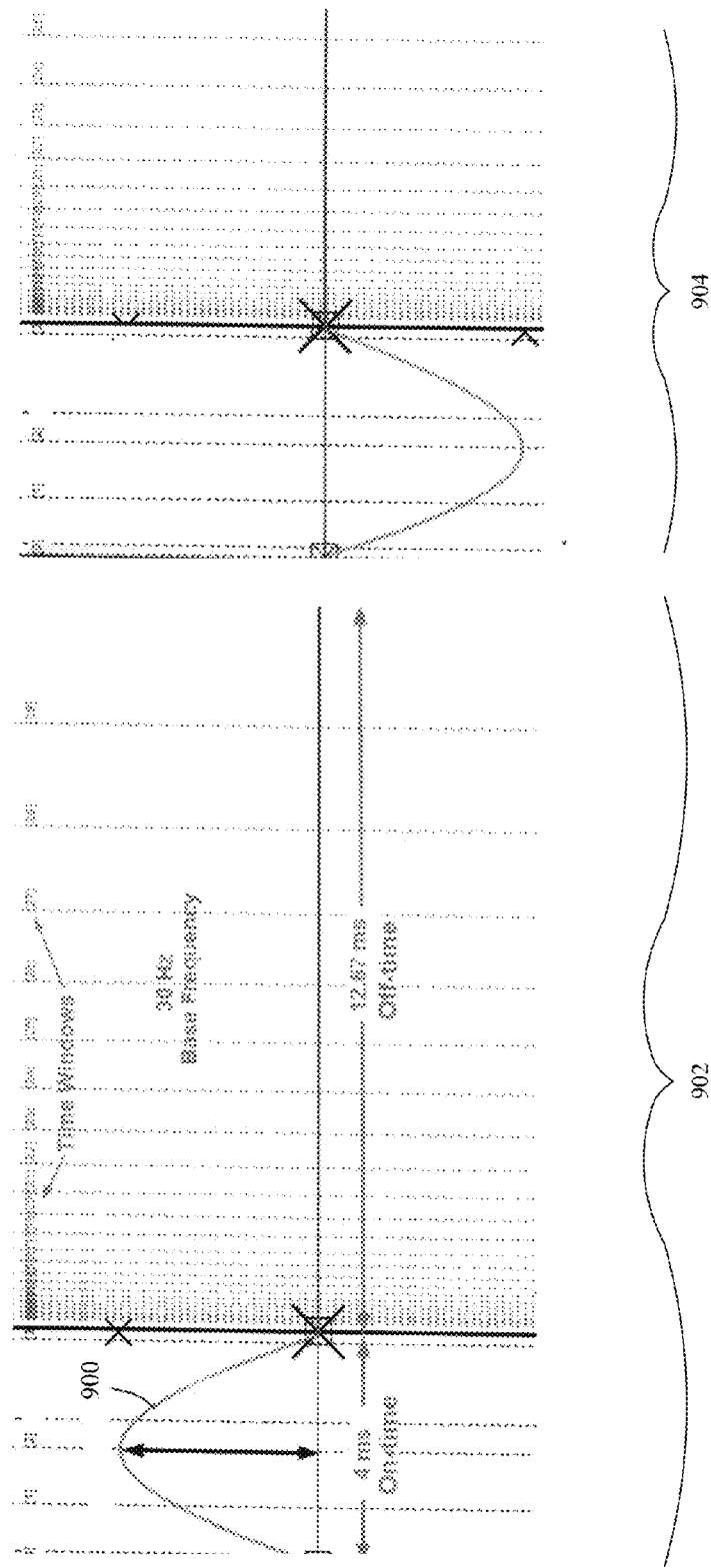
FIG. 9 is a graph illustrating windows channels of the survey EM signals.

FIG. 9 illustrates the time channels or time windows 1 to 29 for the OFF-time interval for a base frequency of 30 Hz for the survey transmitter, for a half-sine pulse 900 applied to the survey transmitter during a first sequence 902. The windows extend along X axis defining logarithmically spaced sampling times. Note that both FIGS. 8 and 9 show that the voltage applied to the survey transmitter during a second sequence 904 has an opposite polarity and this is done on purpose for increasing the signal-to-noise ratio. The example shown in FIG. 9 uses a 4 ms ON-time interval and a 12.67 ms OFF-time interval. Other values can be used.

Figure 10A:
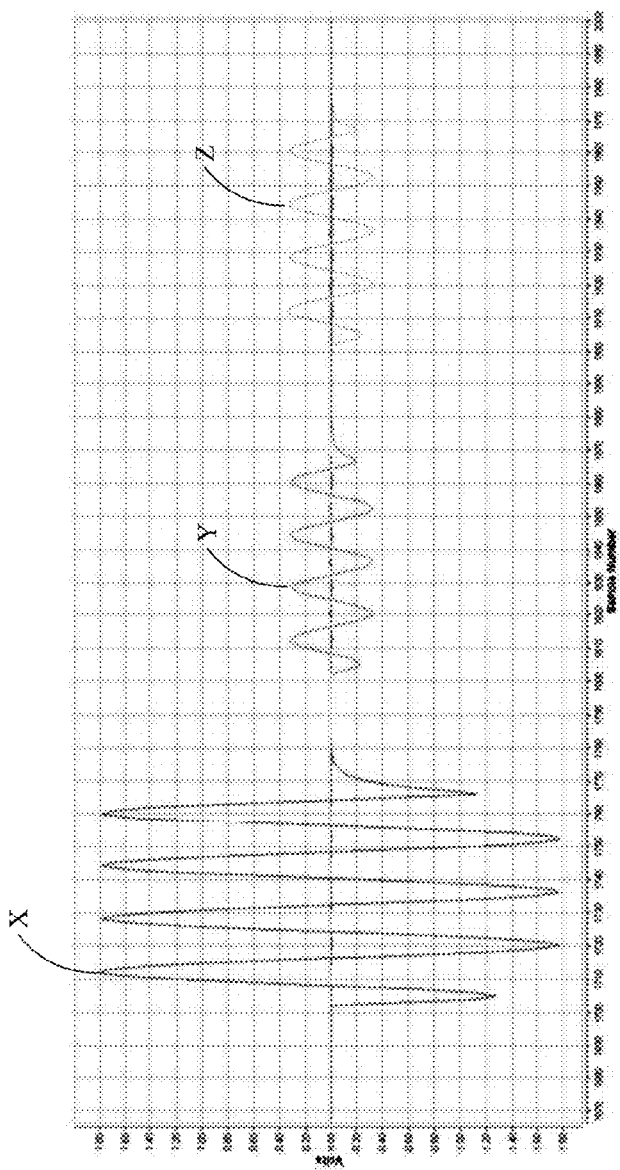
FIGS. 10A-C illustrate the tracking signals measured by the receiver for various orientation of the receiver.
Figure 10B:
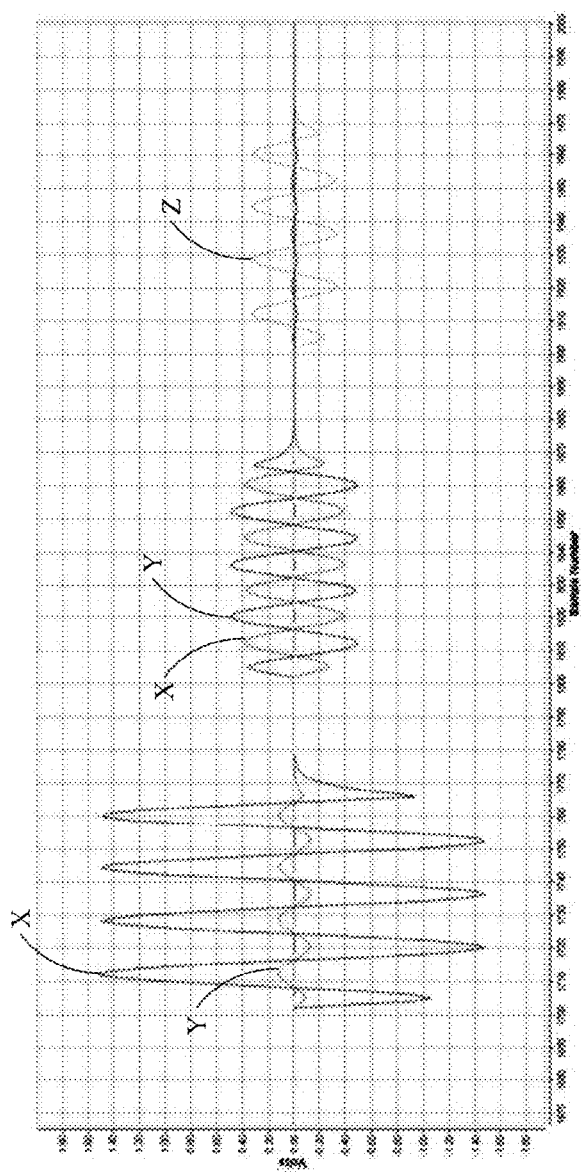
Figure 10C:
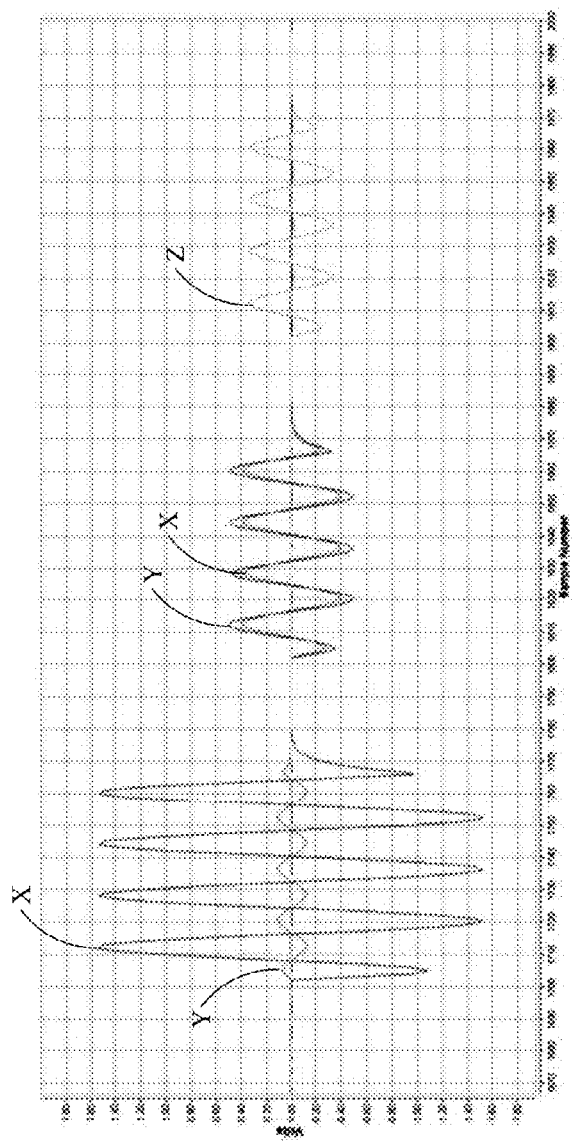

The recorded tracking signals are illustrated in FIGS. 10A-C for a couple of different orientations of the receiver relative to the tracking transmitter. FIG. 10A shows a situation when the X axis of one receiver coil is aligned with the tracking transmitter's axis, thus the yaw and pitch are zero. FIG. 10B shows a situation when there is a +20 degrees yaw and FIG. 10C shows a situation when there is a −20 degrees yaw. It can be seen in the figures that the polarity of both the X and Y waveforms are opposite to each other in FIG. 10B and the same in FIG. 10C for the above yaw values, with no changes in the Z waveform. These figures show that each combination of position and orientation for the receiver and tracking transmitter has its own "signature" in terms of the recorded tracking signals and thus, it is possible that a controller determines the actual position and orientation of the receiver relative to the ground.

In one embodiment, the tracking transmitter generates uni-polar tracking signals having the same polarity during the positive and negative EM cycles or at least a portion thereof, thus allowing for considerable tracking signal cancellation during normal stacking with the ground EM response, and as such improves the sensitivity and accuracy of the EM data interpretation. However, a person skilled in the art would appreciate that in some embodiments polarized tracking signals can be used.

In another application, the tracking signals are synchronized with the sampling of the signals of the transmitter 314 that induce the ground EM response, so that the receiver 322 simultaneously measures a synchronized EM response from the tracking signals and the survey signals generated from the survey transmitter 314.

For example, in a time-domain EM system (TDEM), the tracking signals are synchronized with the sampling of the signals of the transmitter 314 in respective axes in the late OFF-time to allow for almost perfect removal of the tracking signals thereby providing receiver coil position/orientation estimates without impacting the signal to noise ration of the EM system. As a result, the tracking transmitter 324 enables extracting the receiver coil positions from the standard EM measurement data, which naturally embed the tracking signals as discussed above.

The synchronization amongst the operations of the survey transmitter 314, the tracking transmitter 324 and the receiver 322 can be implemented in a number of ways as now discussed.

In general, magnetic tracking systems are not applied to TDEM system because the tracking signal is additive and can mask the very small signals of interest, i.e., the survey EM data. Transmitting uni-polar tracking signals synchronized with the EM sampling axis in the late OFF-time theoretically allows almost perfect removal of the tracking signal providing position estimates of the receiver coil without impacting the signal-to-noise for the survey EM data. Note that this type of tracking signal is naturally embedded in the EM data stream. If a tracking signal transmitter is added.

Thus, in one embodiment, the tracking signals will have the same polarity during the positive and negative EM half cycles, allowing for considerable tracking signal cancellation during normal stacking. The EM receiver's position and orientation estimate derived from the magnetic field tracking system should provide the information necessary for accurate coil motion compensation.

For very low base frequencies, the magnetic tracking system could be augmented with an inertial system comprised of accelerometers and roll rate sensors. Inertial sensors measure changes in position and orientation accurately but suffer from integration drift. The tracking signal will provide accurate position and orientation data at twice the base frequency. Fusing high-speed inertial sensor data with the tracking signal position estimates may provide a continuous coil motion curve suitable for sub EM cycle compensation. This is essentially equivalent to GPS slaved inertial systems used in commercial navigation systems.

Figure 11:
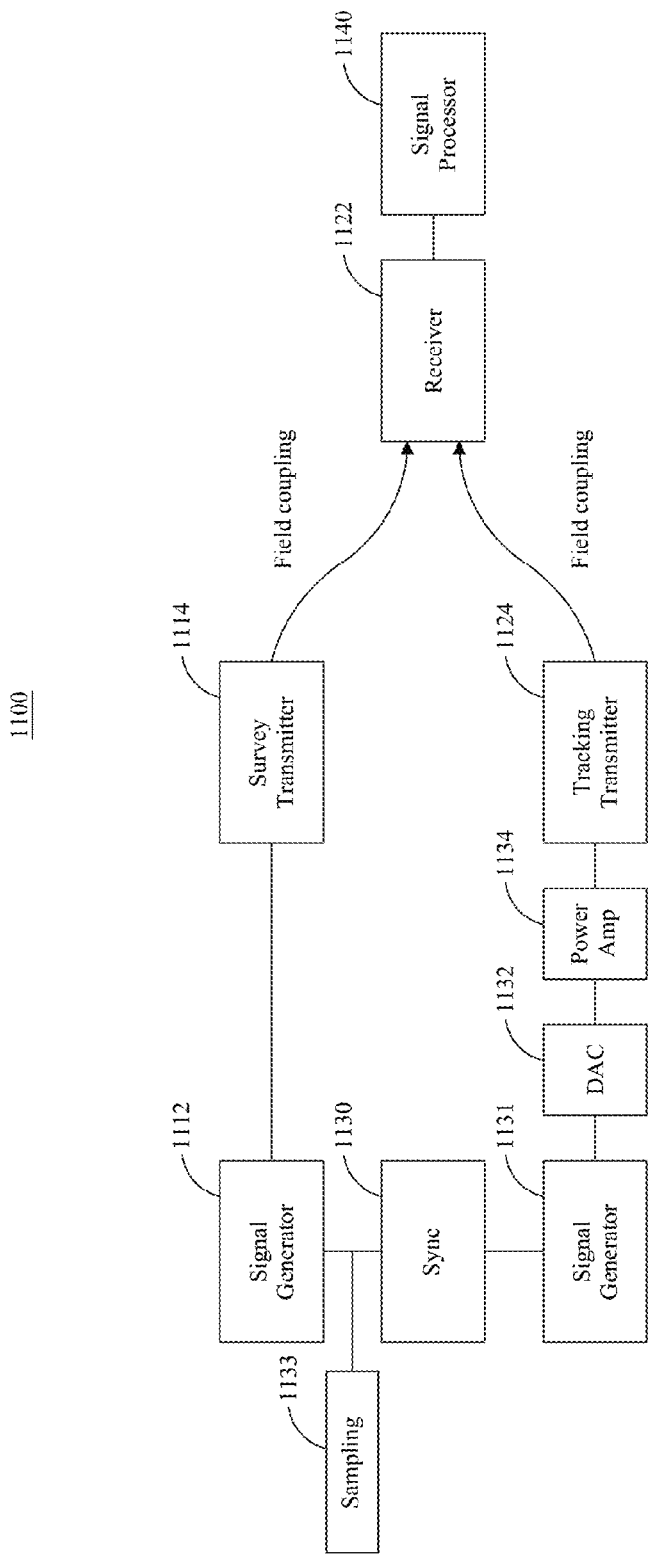
FIG. 11 is a schematic diagram of the EM system with the tracking transmitter and associated electronics.

Referring to the block diagram shown in FIG. 11, according to an embodiment, a synchronization unit 1130 coordinates or controls the timing, transmission, sampling, combining, multiplexing, reception and/or processing of various signals in the EM system 1100 as now discussed. It is to be noted that the synchronization unit 1130 may be implemented as an independent component or on any suitable platform or hardware, including the signal processor or a host computer (not shown).

As an example, the synchronization mechanism between the survey transmitter 1114 and the tracking transmitter 1124 includes a digital-analog converter (DAC) 1132 synchronously coupled to the sampling circuitry 1133 of the survey transmitter 1114 for converting relevant digital values thereof to analog signals. The analog signals are fed to a power amplifier 1134 for driving the transmitter coils of the tracking transmitter 1124 in the form of AC signals or pulsed DC signals. FIG. 11 also shows the signal generator 1112 for the survey transmitter 1114 and the signal generator 1131 for the tracking transmitter 1124. A synchronizing device 1130 is connected to both signal generators. In one embodiment, the tracking transmitter 1124 transmits tracking signals at a frequency that is different from the EM pulse repetition rate (base frequency) of the EM transmitter 1114. In another embodiment, the tracking signals are transmitted at a frequency that is higher than the EM pulse repetition rate. In still another embodiment, the tracking signals are transmitted at approximately twice or other integral multiples of the EM pulse repetition rate or base frequency.

In some embodiments, the EM system described herein comprises a signal processor 1140 or means for processing the EM data. In particular, the signal processor 1140 is configurable to derive coordinates of the receiver as a function of the tracking signal measurements. Based on the computed receiver position and orientation information, accurate receiver movement compensation for the ground EM measurements can be obtained using suitable methods known in the art or improvements thereto.

For example, when three-axis tracking transmitter 1124 and three-axis receiver 1122 are used, the signal processor 1140 extracts the tracking signal measurements from the EM data stream to form a nine-element measurement matrix equation. Combined with certain known position or orientation parameter(s) obtained from the GPS system, this matrix is used to accurately compute the coordinates of the receiver coils relative to the tracking transmitter 1124.

In some embodiments, a plurality of tracking transmitters are positioned around a circumference of the receiver section, for providing further movement information, and thus, enabling enhanced compensation accuracy and/or providing redundancy should one of the tracking transmitters fails during operation.

In some embodiments, the one or more tracking transmitters can be at fixed locations or positions near the receiver coils on the receiver structure of the receiver section. They transmit small field signals which can be synchronized to calibrate the physical properties, such as the physical draft or change of the receiver. This can be a useful real-time calibrating device of the receiver coil.

Regarding the receivers used in the above embodiments, those skilled in the art will recognize an EM receiver is understood to be any sensor capable of measuring a magnetic field, magnetic field change or other quantity indicative of the magnetic field or magnetic field change or magnetic moment. In one embodiment, multiple receivers of multiple types of sensors may be combined to sample the electromagnetic signal, for example, fluxgate sensors, SQUID sensors (Magnicon, Germany), caesium magnetometers, magnetoresistive sensors, Hall sensors, induction coil sensors, etc.

Figure 12:
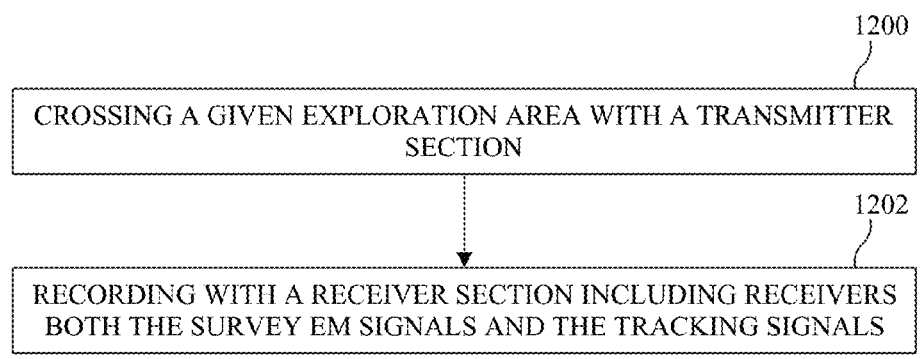
FIG. 12 is a flowchart of a method for determining the position and/or orientation of a receiver with a tracking transmitter.

According to an embodiment illustrate in FIG. 12, there is a method for determining the position and/or orientation of an electromagnetic (EM) receiver. The method includes a step 1200 of crossing a given exploration area with a transmitter section 210, wherein the transmitter section includes a survey EM transmitter 314 for generating survey EM signals within a first frequency range and a tracking EM transmitter 324 for generating tracking signals within a second frequency range. The method further includes a step 1202 of recording with a receiver section 220 including receiver 422 both the survey EM signals and the tracking signals. In an additional step, the controller calculates the actual position and orientation of the receiver 422 based on the recorded tracking signals. In still another step, the actual position and orientation of the receiver is used to adjust the recorded survey EM data. In yet another step, the adjusted survey EM data is processed to generate an image of the surveyed subsurface.

The above discussed receivers suffer not only from noise induced by their changing position, but also because they are sensitive to thermal variations. This is commonly referred to in the art as drift. The dominant factor is the change of resistivity of the coil due to the thermal coefficient of the material. Copper has a resistive temperature coefficient of 0.39%/° C. or 3900 ppm/° C., which impacts both the amplitude and phase of the received signal in a complex manner.

The physical geometry of the receiver windings will change with temperature due to thermal expansion or contraction of the coil or the coil form. For copper wound coils, the coefficient of thermal expansion or contraction is approximately 17 ppm/° C. Multilayer coils exhibit a complex relationship between temperature and inductance due to the change in coupling between physical layers. Additionally, signal amplifiers and measurement circuits impose circuit and temperature dependent amplitude and phase drift. These error sources add in a complex manner impacting significantly the receiver's transfer function masking ppm level responses. Continuous calibration of the receiver's transfer function is necessary to recover the correct ground resistivity.

The conventional deconvolution equation to correct for changes in a system's transfer function is:

$$B_S(\omega) = \frac{V_S(\omega)}{I_S(\omega)} \times \frac{I_A(\omega)}{V_A(\omega)} \times M_{ideal}(\omega) \quad (1)$$

where:
$B_S(\omega)$ is the desired response,
$M_{ideal}(\omega)$ is the ideal waveform for the desired response,
$V_S(\omega)$=FFT of $V_S(t)$ where $V_S(t)$ is the instantaneous receiver voltage waveform,
$I_S(\omega)$=FFT of $I_S(t)$ where $I_S(t)$ is the instantaneous transmitter current waveform,
$V_A(\omega)$=FFT of $V_A(t)$ where $V_A(t)$ is the high-altitude receiver reference waveform, and
$I_A(\omega)$=FFT of $I_A(t)$ where $I_A(t)$ is the high-altitude transmitter current waveform.

The deconvolution equation (1) corrects for transmitter drift but does not correct for nonlinear effects or receiver drift. A method was described in the art for correcting for time shifts between instantaneous and reference waveforms to improve the $B_S(\omega)$ estimate, but this method did not consider continuous receiver calibration.

The deconvolution equation to correct for both transmitter and receiver drift is given by:

$$B_S(\omega) = \frac{K_S(\omega) V_S(\omega)}{I_S(\omega)} \times \frac{I_A(\omega)}{V_A(\omega)} \times M_{ideal}(\omega) \quad (2)$$

where:

$$K_S(\omega) = \frac{R_A(\omega)}{R_S(\omega)},$$

$R_A(\omega)$ is the receiver transfer function determined at the same time as the reference waveform; and
$R_S(\omega)$ is the instantaneous receiver transfer function.

Thus, if $R_A(\omega)$ and $R_S(\omega)$ are known, the sensor can be continuously calibrated. Since the reference receiver transfer function is determined at high altitude and a certain temperature, and the instantaneous receiver transfer function varies with the survey temperature, then the desired response can been corrected for drift within each sortie and is described by:

$$B_S(\omega) = \frac{K_S(\omega) V_S(\omega)}{I_S(\omega)} \times \frac{I_A(\omega)}{V_A(\omega)} \times M_{ideal}(\omega) \times \frac{R_L(\omega)}{R_A(\omega)} \quad (3)$$

where $R_L(\omega)$ is the laboratory determined transfer function. This formulation calibrates $B_S(\omega)$ to a constant thermal environment.

In time-domain systems, only the odd harmonics of the transmitter base frequency are of interest, which implies that only the receiver transfer functions at odd harmonics of the transmitter base frequency need to be determined. The receiver transfer function can be determined experimentally for a range of frequencies in a laboratory controlled environment providing $K_S(\omega)$ as a function of temperature. In this case, continuous calibration is accomplished by measuring the temperature of the receiver coil and using a look up table to provide the calibration factors.

Direct measurement of the receiver transfer function can be accomplished by exposing the coil to a known signal while simultaneously measuring the sensor response. International Patent Application WO 2014/056069 discloses a method of using a calibration loop in close proximity to the sensor to determine correction factors by generating known magnetic fields in a method similar to the well-known Helmholtz method. However, this method lacks the ability to continuously calibrate the receiver and relies on known calibration factors for a first frequency range and a calibration response signal for a second frequency range.

A more accurate method is to connect the receiver to a signal generator synchronized with the data acquisition system through a suitable resistor. Measurements of the signal generator voltage, the voltage across the coil and the current through the coil (which is proportional to the voltage drop across the resistor) provides both impedance and phase for a specific test frequency and temperature. A complete calibration sequence includes emitting one or more cycles of a narrow band sine wave at each odd harmonic of the transmitter base frequency providing the receiver transfer function.

Alternatively, the signal generator could be configured to generate a square waveform to provide the receiver transfer function. Narrow band sinusoidal waveforms provide better overall signal to noise. Regardless, $R_A(\omega)$ is determined at high-altitude with the transmitter off. $R_S(\omega)$ is determined by suitably connecting the receiver to the calibration circuits at a known time ensuring the calibration signal does not interfere with measurement of the ground response (e.g., in the late OFF-time using logic as described to determine position and orientation or a periodic calibration cycle) providing a continuous measure of the receiver transfer function.

A calibration method presented herein includes a full system calibration performed out of ground effect combined with a continuous update to the calibration coefficients.

Airborne time-domain systems include wideband transmitters and receivers to maximize depth and resolution of conductivity estimates. Calibration accuracy depends on the frequency response estimates for all frequencies of interest. The method discussed now includes sequentially generating sinusoidal current waveforms for the base frequency and all harmonics up to and including the Nyquist frequency. The discrete frequency response measurements are combined to provide an accurate system response. The system response is removed from the measured waveforms using known deconvolution techniques.

Figure 13:
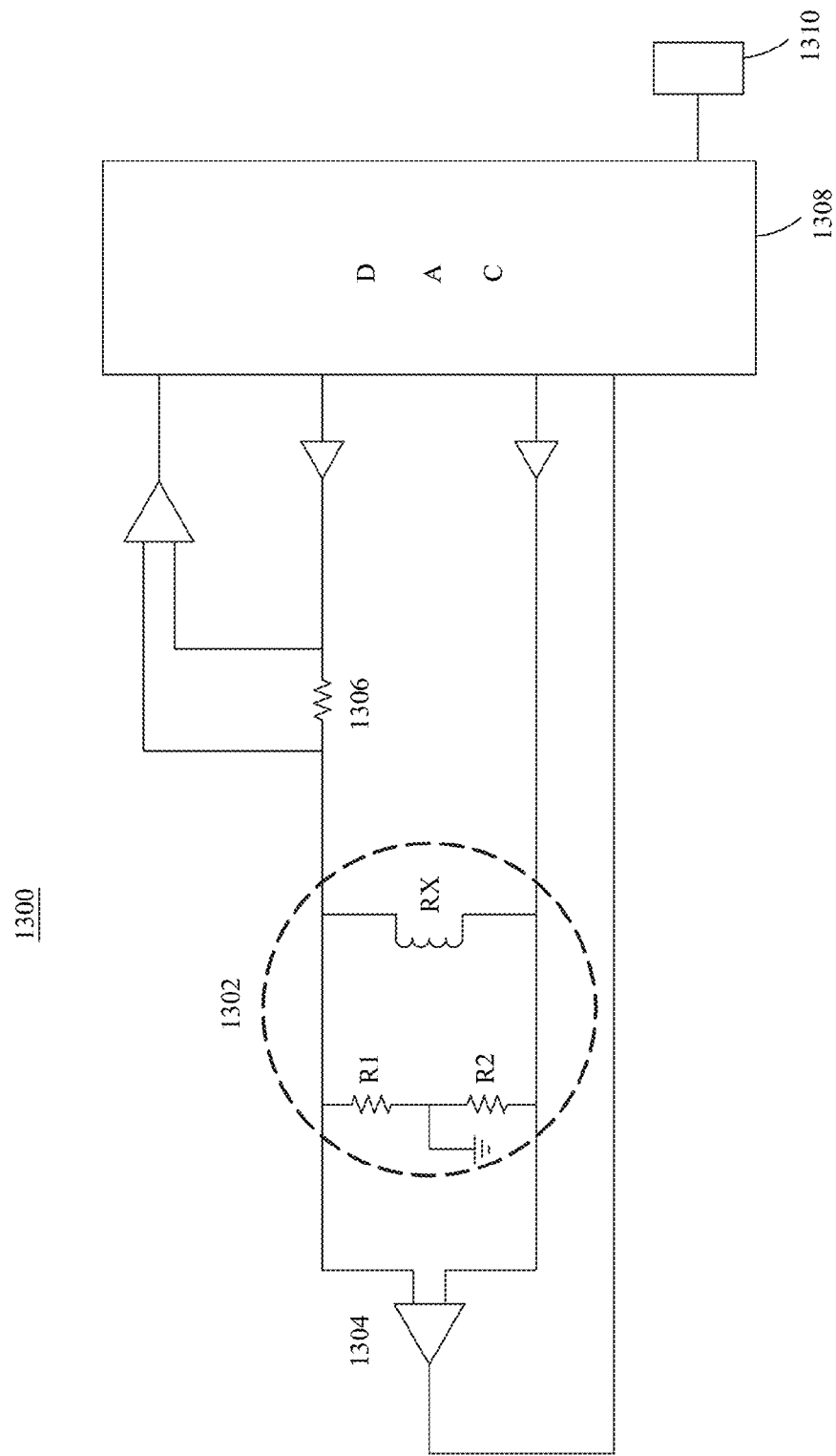
FIG. 13 is a schematic diagram of a calibrating device associated with a receiver.

FIG. 13 is a block diagram of a calibration device 1300 used to drive a current waveform through a receiver 1302 (which is characterized by resistances $R_1$ and $R_2$ and inductance RX) under test. Measurements for both the voltage 1304 across receiver 1302 and the current through receiver 1302, measured at resistor 1306, are performed and then provided to a digital to analog converter 1308 for calculating the impedance or frequency response of the receiver as per Ohm's law. Digital to analog converter 1308 may include or be connected to a power source 1310 for generating the calibration signal through the receiver 1302. Calibration device 1300 may be located, for example, similar to the tracking transmitter, on the reference frame 440 in FIG. 4. In another application, calibration device may be located on receiver housing 430. In still another application, calibration device 1300 may be integrated inside tracking transmitter 424. FIG. 13 shows a typical receiver coil as the device under test. However, similar circuits could be used to characterize virtually any sensor.

As noted above, time-domain EM sensors are wideband with generally well controlled transmitter bipolar waveforms with an ON- and OFF-time. A single narrow band calibration signal at the base frequency or an odd harmonic may be emitted for each transmitter cycle, similar to the tracking transmitter discussed above. The calibration signal may be precisely synchronized with both the survey transmitter and EM sampling axis (X axis in FIGS. 8 and 9). More accurately, an integer number of cycles of the narrow calibration signal are emitted throughout the transmitter cycle, e.g., located only in the ON-time or only in the OFF-time, similar to the tracking transmitter signal. Knowledge of both the frequency of the calibration signal and its location in time allows near perfect separation of both the calibration signal and the survey EM signal of interest without impacting its signal-to-noise. A new frequency-response estimate will be available each transmitter cycle providing a new system response approximately every, for example, 30 s (dependent on bandwidth).

Figure 14:
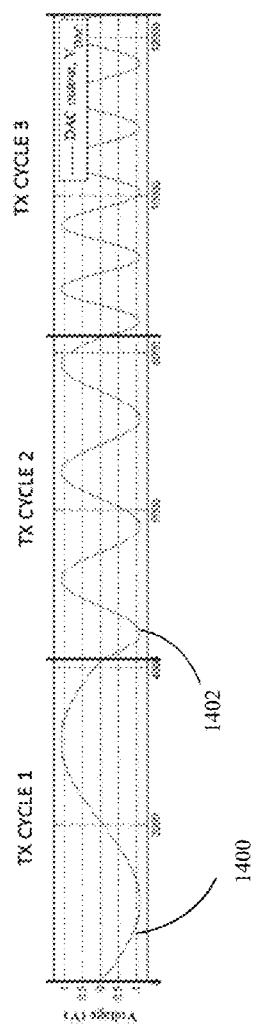
FIG. 14 is a graph illustrating the calibration signals generated with the calibration device.
Figure 15:
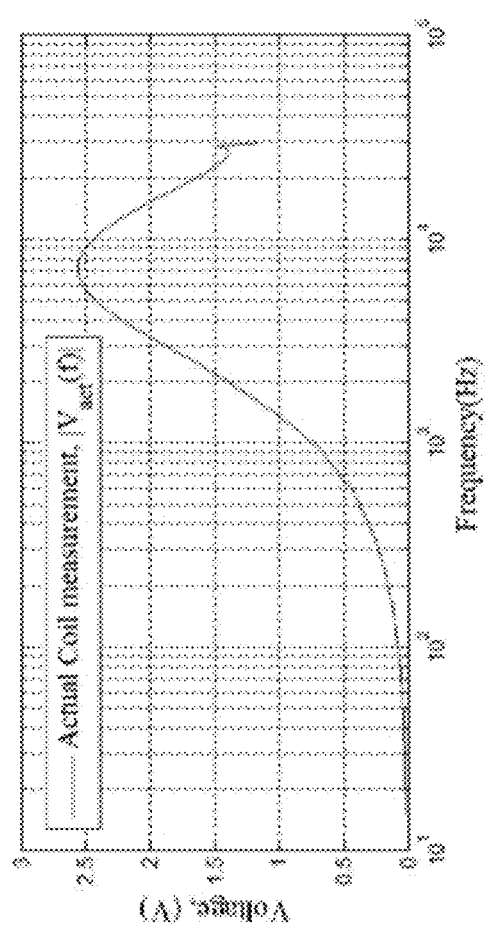
FIG. 15 is a graph illustrating the calibration signals recorded by the receiver.
Figure 16A:
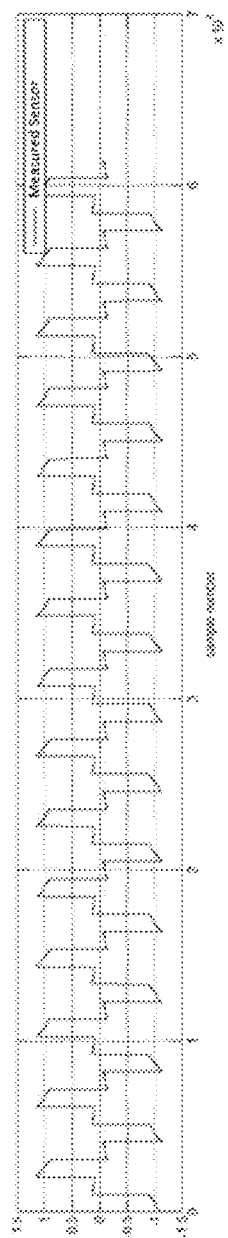
FIGS. 16A-B illustrate the voltages associated with measured and calibrated receivers.
Figure 16B:
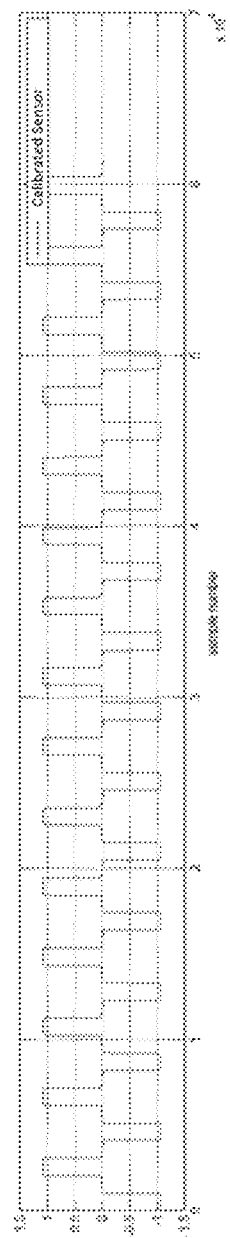

FIG. 14 shows one possible sequence of calibration signals. Note that a first signal 1400 is used during a first cycle, a second signal 1402 during the second cycle, and so on for accounting for the base frequency and the desired harmonics. The cumulative frequency response of a typical receiver coil is shown in FIG. 15. FIG. 16A shows the typical measured receiver and FIG. 16B shows the calibrated sensor response.

In one embodiment, the calibration signal may be inductively coupled to a receiver by installing a concentric coil. Other waveforms than pure sinusoids could be used for the calibration signal.

Figure 17:
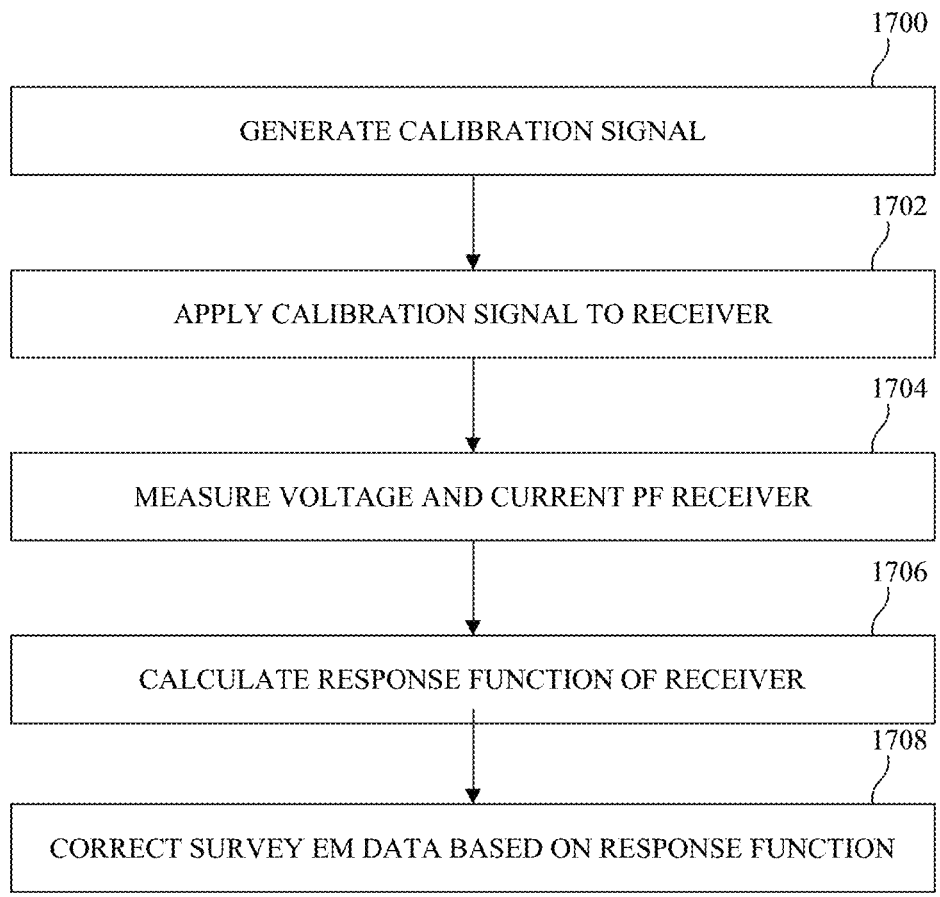
FIG. 17 is a flowchart of a method for continuously calibrating a receiver with a calibrating device.

A calibration method is now discussed with reference to FIG. 17. The calibration method includes a step 1700 of generating a calibration signal with a calibration device 1300. The calibration signal is applied to the receiver 422 in step 1702. At least a voltage across the receiver and a current through the receiver are measured with the calibration device in step 1704. In step 1706, the response function of the receiver is calculated, for example, in the calibration device 1300 or a controller, e.g., element 470 in FIG. 4, as discussed above with regard to equations (1) to (3). The calibration signal may include a first waveform having the base frequency and one or more harmonics of the base frequency. The response function of the receiver is then used in step 1708 to continuously (i.e., during the EM survey) correct/calibrate the measured survey EM data. In one application, the receiver is calibrated each EM base cycle.

There are many possible implementations of the geophysical system discussed above. The geophysical system may include only the components for determining the position and/or orientation of the receiver, only the components for continuously calibrating the receiver, or all of these elements. An electromagnetic geophysical system may include many other peripheral sensors to determine the position or orientation or state of the electromagnetic measurement, such as Global Positioning System (GPS), radar or laser altimeter, gyroscopes or inclinometers measuring transmitter or sensor positions, thermometers for measuring the ambient temperature and/or the receiver coil's temperature, or other sensors measuring other geophysical data (such as radar or laser for topography, gravity or gradiometers sensors, spectrometer sensors, magnetometers to measure the ambient earth magnetic field, etc.). Consequently, there are also many different methods to record, process, combine and control all of these signals and sensors.

Figure 18:
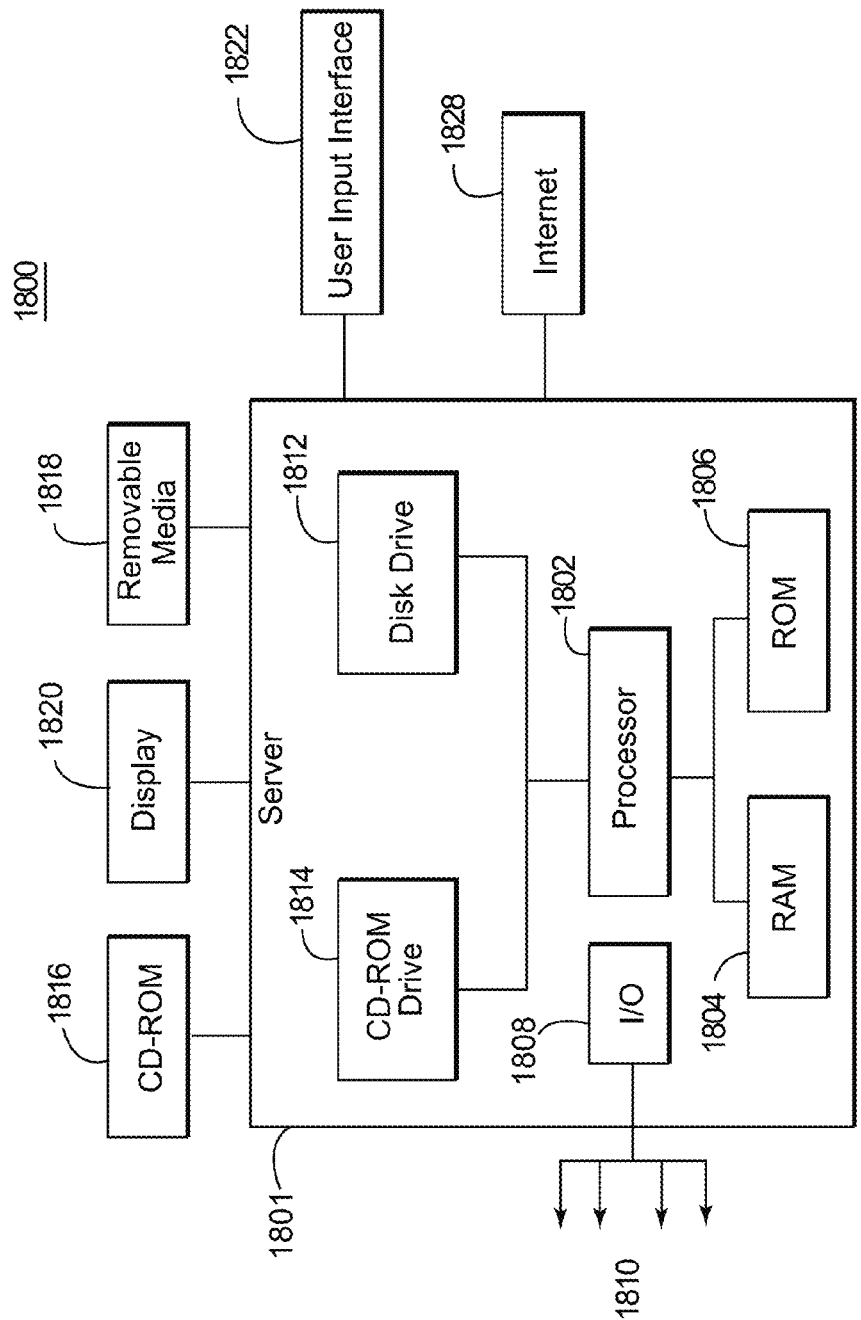
FIG. 18 is a schematic diagram of a control device.

The methods discussed above with regard to FIGS. 12 and 17 may be implemented in a processing device. An example of a processing device capable of carrying out operations in accordance with the embodiments discussed above is illustrated in FIG. 18. Such processing device may be located on the aircraft, tow assembly, transmitter section, receiver section, in a research facility, distributed at multiple sites, etc. Hardware, firmware, software or a combination thereof may be used to perform the various steps and operations described herein.

The exemplary processing device 1800 suitable for performing the activities described in the exemplary embodiments may include server 1801. Such a server 1801 may include a central processor unit (CPU) 1802 coupled to a random access memory (RAM) 1804 and/or to a read-only memory (ROM) 1806. The ROM 1806 may also be other types of storage media to store programs, such as programmable ROM (PROM), erasable PROM (EPROM), etc. Processor 1802 may communicate with other internal and external components through input/output (I/O) circuitry 1808 and bussing 1810, to provide control signals and the like. For example, processor 1802 may communicate with the various EM receivers, transmitter, etc. Processor 1802 carries out a variety of functions as are known in the art, as dictated by software and/or firmware instructions.

Server 1801 may also include one or more data storage devices, including disk drives 1812, CD-ROM drives 1814, and other hardware capable of reading and/or storing information, such as a DVD, etc. In one embodiment, software for carrying out the above-discussed steps may be stored and distributed on a CD-ROM 1816, removable media 1818 or other form of media capable of storing information. The storage media may be inserted into, and read by, devices such as the CD-ROM drive 1814, disk drive 1812, etc. Server 1801 may be coupled to a display 1820, which may be any type of known display or presentation screen, such as LCD, plasma display, cathode ray tube (CRT), etc. A user input interface 1822 is provided, including one or more user interface mechanisms such as a mouse, keyboard, microphone, touch pad, touch screen, voice-recognition system, etc.

Server 1801 may be coupled to other computing devices, such as the equipment of the carrier, via a link or network. The server may be part of a larger network configuration as in a global area network (GAN) such as the Internet 1828, which allows ultimate connection to the various landline and/or mobile devices involved in the survey.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer-readable medium may be utilized, including hard disks, CD-ROMs, digital versatile discs (DVD), optical storage devices or magnetic storage devices such as a floppy disk or magnetic tape. Other non-limiting examples of computer-readable media include flash-type memories or other known types of memories.

This written description uses examples of the subject matter disclosed to enable any person skilled in the art to practice the same, including making and using any devices or systems and performing any incorporated methods. For greater clarity, the figures used to help describe the invention are simplified to illustrate key features. For example, figures are not to scale and certain elements may be disproportionate in size and/or location. Furthermore, it is anticipated that the shape of various components may be different when reduced to practice, for example. The patentable scope of the subject matter is defined by the claims, and may include other examples that occur to those skilled in the art. Such other examples are intended to be within the scope of the claims. Those skilled in the art would appreciate that features from any embodiments may be combined to generate a new embodiment.

The disclosed embodiments provide a EM system capable of tracking and/or calibrating its receiver. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. An electromagnetic (EM) system for measuring EM signals, the EM system comprising:
    a survey EM transmitter for generating survey EM signals within a first frequency range;
    a tracking reference frame;
    a tracking EM transmitter for generating tracking signals within a second frequency range, wherein the tracking EM transmitter is rigidly attached to the tracking reference frame; and
    a receiver section including a receiver housing and a receiver that measures both the survey EM signals and the tracking signals,
    wherein the receiver housing is attached with a connecting mechanism to the tracking reference frame so that the receiver housing freely translates and rotates in all directions.

2. The system of claim 1, further comprising:
    a controller connected to the receiver and configured to calculate a position and orientation of the receiver relative to the tracking EM transmitter based on the recorded tracking signals.

3. The system of claim 2, further comprising:
    a global positioning system connected to the controller and configured to provide a location of the tracking EM transmitter relative to ground,
    wherein the controller calculates a location and orientation of the receiver relative to ground based on information from the global positioning system and the tracking signals.

4. The system of claim 1, wherein the first frequency range is different from the second frequency range.

5. The system of claim 1, wherein the second frequency range is within the first frequency range.

6. The system of claim 1, wherein the receiver measures the survey EM signals during an OFF-time period and the tracking signals during an ON-time period.

7. The system of claim 1, wherein the receiver measures the survey EM signals during an entire OFF-time period while measuring the tracking signals during a portion of the OFF-time period.

8. The system of claim 7, wherein the portion of the OFF-time period is 20% or less than the entire OFF-time period.

9. The system of claim 1, wherein the receiver section is free to rotate and translate relative to the tracking EM transmitter.

10. The system of claim 1, wherein a distance between the receiver and the tracking EM transmitter is smaller than a radius of the survey transmitter.

11. The system of claim 1, wherein the measured tracking signals propagate directly from the tracking EM transmitter to the receivers.

12. An electromagnetic (EM) system for measuring EM signals, the EM system comprising:
    an aircraft;
    a transmitter section;
    a receiver section;
    a tracking reference frame; and
    a tow assembly connecting the transmitter section and the receiver section to the aircraft,
    wherein the transmitter section includes a survey EM transmitter for generating survey EM signals within a first frequency range, and a tracking EM transmitter for generating tracking signals within a second frequency range, wherein the tracking EM transmitter is rigidly attached to the tracking reference frame; and wherein the receiver section includes a receiver housing and a receiver that measures both the survey EM signals and the tracking signals, and wherein the receiver housing is attached with a connecting mechanism to the tracking reference frame so that the receiver housing freely translates and rotates in all directions.

13. The system of claim 12, further comprising:

a controller connected to the receiver and configured to calculate a position and orientation of the receiver relative to the tracking EM transmitter based on the recorded tracking signals.

14. The system of claim 13, further comprising:

a global positioning system connected to the controller and configured to provide a location of the tracking EM transmitter relative to ground, wherein the controller calculates a location and orientation of the receiver relative to ground based on information from the global positioning system and the tracking signals.

15. The system of claim 13, wherein the receiver measures the survey EM signals during an entire OFF-time period while measuring the tracking signals during a portion of the OFF-time period.

16. A method for determining the position and/or orientation of an electromagnetic (EM) receiver, the method comprising:

crossing a given exploration area with a transmitter section, wherein the transmitter section includes a survey EM transmitter for generating survey EM signals within a first frequency range and a tracking EM transmitter for generating tracking signals within a second frequency range, wherein the tracking EM transmitter is rigidly attached to a tracking reference frame; and recording with a receiver section including a receiver housing and a receiver, both the survey EM signals and the tracking signals, wherein the receiver housing is attached with a connecting mechanism to the tracking reference frame so that the receiver housing freely translates and rotates in all directions.

17. The method of claim 16, further comprising:

calculating in a controller a position and/or orientation of the receiver relative to the tracking EM transmitter based on the recorded tracking signals.

18. The method of claim 17, further comprising:

receiving from a global positioning system, connected to the controller, a location of the tracking EM transmitter relative to ground; and calculating a location and orientation of the receiver relative to ground based on the global positioning system and the recorded tracking signals.

19. The method of claim 16, wherein the measured survey EM signals and the measured tracking signals have different frequencies.

20. The method of claim 16, wherein the receiver measures the survey EM signals during an entire OFF-time period while measuring the tracking signals during a portion of the OFF-time period.

* * * * *